3,019,251
PRODUCTION AND USE OF SODIUM DIMETHOXYBORYL

Gilbert Gavlin, Morton J. Klein, and Richard G. Maguire, Chicago, Ill., assignors, by mesne assignments, to Callery Chemical Company, Pittsburgh, Pa., a corporation of Pennsylvania
No Drawing. Filed May 10, 1955, Ser. No. 507,722
9 Claims. (Cl. 260—462)

This invention relates to a new composition of matter known as sodium dimethoxyboryl, $NaB(OCH_3)_2$, and more particularly it relates to the production and use of sodium dimethoxyboryl for the preparation of dimethoxyborane, $HB(OCH_3)_2$.

Several methods have been devised for preparing dimethoxyborane none of which are entirely satisfactory. Schlesinger and co-workers used the reaction of methanol or methyl formate with diborane but these methods required several hours to complete or were difficult to control. Furthermore, diborane is an expensive starting material and since the primary use of dimethoxyborane is as an intermediate in the preparation of diborane these methods are obviously not feasible unless the dimethoxyborane is intended for other uses. In recent years attempts have been made to prepare dimethoxyborane without using diborane as a starting material. These efforts have now culminated in a method utilizing the new compound sodium dimethoxyboryl which shows great promise as a reagent for introducing the dimethoxyboryl radical into various molecules. Treatment of this compound with a mineral acid will produce dimethoxyborane directly which can in turn be decomposed to yield diborane.

It is an object of this invention to provide a method for preparing a new composition of matter known as sodium dimethoxyboryl.

Another object is to provide a new and useful method by which sodium dimethoxyboryl can be treated with a mineral acid to yield dimethoxyborane.

Other objects will become apparent throughout the specification and appended claims which follow.

This new composition of matter and means for converting it to dimethoxyboran will be more fully described hereinafter and the novelty thereof will be particularly pointed out and distinctly claimed.

This invention is based upon the discovery that sodium dimethoxyboryl can be prepared by the reaction of sodium with dimethoxychloroborane, $BCl(OCH_3)_2$, according to the following equation:

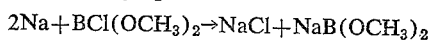

The dimethoxychloroborane is conveniently prepared by the reaction of methanol or trimethyl borate with boron trichloride. Sodium dimethoxyboryl is a blue-purple solid which turns white when exposed to air or water but which is stable at temperatures as high as 100° C. in an inert atmosphere. We have further discovered that sodium dimethoxyboryl can be readily converted to dimethoxyborane by treatment with a mineral acid, such as hydrogen chloride, according to the following chemical equation:

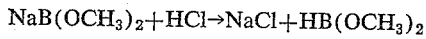

In one experiment, 1.15 g. (50 millimols) of sodium was dispersed in 10 ml. of rapidly refluxing isooctane in a 100 ml. 3-necked flask equipped with a high speed stirrer and a water cooled reflux condenser. The condenser was connected to a trap cooled in liquid nitrogen and the system was provided with a nitrogen seal. The sodium dispersion was cooled to room temperature and an additional 20 ml. of isooctane was introduced. A dropping funnel containing 16.25 g. (150 millimols) of dimethoxychloroborane was inserted in the third neck of the reaction flask and the dropwise addition of the dimethoxychloroborane was started. The reaction proved to be sluggish at room temperature, but proceeded smoothly at reflux temperature. The mixture was refluxed for five minutes after each addition of 2–4 ml. of dimethoxychloroborane. Although only half of the dimethoxychloroborane had been expected to react an exothermic reaction followed the introduction of every portion, including the last. The mixture was then refluxed for an additional hour and allowed to stand at room temperature overnight. At this point the flask contained a suspension of blue and white solid particles which had partially settled in the bottom of the flask. The entire contents of the reaction flask was then placed in an ampoule which contained a magnet for subsequent stirring. The ampoule was provided with a connection to a high vacuum line and its contents were degassed. The volatile components were then distilled out and hydrolyzed with sodium hydroxide. The blue colored solid which remained was indicated by the stoichiometry of the reaction to be a new compound sodium dimethoxyboryl ($NaB(OCH_3)_2$). The identity of this material as a new compound was further established by X-ray studies. This solid material, sodium dimethoxyboryl, was then allowed to react with 494 cc. (22 millimols) of anhydrous hydrogen chloride. The hydrogen chloride was maintained as a liquid over the solid by immersing the ampoule in a −112° C. bath. The initial pressure in the ampoule was 71 mm. but after 1 hour the pressure had decreased to 31 mm. indicating the formation of a less volatile product. A total of 13.7 cc. of gas was obtained after removal of all excess HCl. This gas was identified by molecular weight as dimethoxyborane, $HB(OCH_3)_2$. The stoichiometry of the reaction which produced the compound together with the evolution of dimethoxyborane establishes the identity of the new compound as being sodium dimethoxyboryl.

In another experiment, 5.65 g. (246 millimols) of sodium ribbon and 20 ml. of dry isooctane were placed in a suitable 3-necked flask equipped with a magnetic stirrer, dropping funnel, thermometer, and liquid nitrogen trap. To this mixture was slowly added with stirring 490 millimols of dimethoxychloroborane using an anhydrous nitrogen atmosphere. The reaction went smoothly with the temperature never exceeding 32° C. Upon completion of the reaction, the flask contained a suspension of blue and white solid particles in a light yellow mobile liquid. The bulk of the liquid was removed in a nitrogen atmosphere using a filter stick. The residue was agitated with several successive portions of isooctane and the liquid removed with the filter stick. In this manner the soluble portions of the residue were extracted with isooctane. The removal of residual liquid was accomplished by evaporation under vacuum. Further purification of the solid salt by distillation under vacuum resulted in the recovery of a substantial amount of the boron values as trimethyl borate and sodium dimethoxyboryl. The solid residue was treated with dry HCl and found to produce dimethoxyborane as in the previous experiment. In this experiment the yield of sodium dimethoxyboryl as indicated by the amount of dimethoxyborane formed was about 22%. Since any excess dimethoxychloroborane would tend to react with the sodium dimethoxyboryl to produce tetramethoxydiborane, $(CH_3O)_4B_2$, which is known to be unstable and to decompose to trimethyl borate, it was concluded that better yields of sodium dimethoxyboryl could be obtained if an excess of sodium was used to stop the reaction after the formation of the sodium dimethoxyboryl.

In still another experiment, an excess of sodium was used to carry out the reaction. A 3-necked flask equipped with a magnetic stirrer was charged with 1380 g. of a 0.5% sodium amalgam containing 300 millimols of sodium. To this amalgam 100 millimols of dimethoxychloroborane were added over a period of 30 minutes in an anhydrous nitrogen atmosphere. During the addition of the dimethoxychloroborane no increase in reaction temperature above room temperature was observed. A liquid nitrogen trap was connected to the outlet system from the flask to condense the more volatile by-products. Stirring was continued for another eight hours at about 30° C. after which time the nitrogen trap was disconnected. A blue-gray residue was left in the reaction flask and was separated from the liquid products using a filter stick and extracted with isooctane as in the previous experiments. X-ray diffraction analysis of this solid residue confirmed the presence of the new compound previousl identified as sodium dimethoxyboryl. In this experiment the yield of sodium dimethoxyboryl was calculated to be about 58%. In each of the three experiments the sodium dimethoxyboryl was obtained mixed with sodium chloride by-product of the reaction. The separation of the pure compound from the sodium chloride has not been accomplished due to the unavailability of a solvent which is not reactive with the salt. As in the other experiments the evidence for the formation of sodium dimethoxyboryl was also furnished by the stoichiometry of the reaction and the liberation of dimethoxyborane upon acidification.

Having thus described this invention and the best mode contemplated for carrying it out, it should be understood that within the scope of the appended claims this invention may be practiced otherwise than as specifically described.

What we desire to claim and secure by United States patent is:

1. A method of preparing sodium dimethoxyboryl, $NaB(OCH_3)_2$, which comprises reacting, under anhydrous conditions, sodium with dimethoxychloroborane, $BCl(OCH_3)_2$, in a molar ratio of sodium to dimethoxychloroborane of at least 2:1 and recovering the sodium dimethoxyboryl formed.

2. A method according to claim 1 in which a stoichiometric excess of sodium is used based on the reaction: $2Na + BCl(OCH_3)_2 \rightarrow NaB(OCH_3)_2 + NaCl$.

3. A method according to claim 2 in which said sodium is used in the form of its analgam.

4. As a new composition of matter, the compound sodium dimethoxyboryl represented by the formula, $NaB(OCH_3)_2$.

5. A method of preparing dimethoxyborane, $HB(OCH_3)_2$, which comprises treating sodium dimethoxyboryl with an anhydrous mineral acid and recovering the dimethoxyborane formed.

6. A method according to claim 9 in which the mineral acid is hydrogen chloride.

7. A method of preparing dimethoxyborane which comprises reacting, under anhydrous conditions, sodium with dimethoxychloroborane in a molar ratio of 2 to 1, recovering the resulting solid reaction product, treating said reaction product with anhydrous hydrogen halide and recovering the dimethoxyborane formed.

8. A method according to claim 7 in which the hydrogen halide is hydrogen chloride.

9. A method according to claim 5, said mineral acid being a hydrogen halide.

References Cited in the file of this patent

Kinney et al.: J. Amer. Chem. Soc., 57, pp. 2396–97 (1935).

Wiberg et al.: "Berichte," vol. 70 (1937).

Brown et al.: "American Chem. Soc. Jour.," vol. 75 (1953), page 192.